No. 12,436. REISSUED JAN. 16, 1906.

O. E. THOMPSON.

KRAUT CUTTER.

APPLICATION FILED JUNE 29, 1905.

2 SHEETS—SHEET 1.

Witnesses
O. B. Baenziger
J. G. Howlett

Inventor
Oliver E. Thompson

By E. S. Wheeler & Co. Att'ys.

No. 12,436. REISSUED JAN. 16, 1906.

O. E. THOMPSON.

KRAUT CUTTER.

APPLICATION FILED JUNE 29, 1905.

2 SHEETS—SHEET 2.

Witnesses
O. B. Baenziger.
F. G. Howlett.

Inventor,
Oliver E. Thompson.
By E. A. Wheeler & Co. Atty's

UNITED STATES PATENT OFFICE.

OLIVER E. THOMPSON, OF YPSILANTI, MICHIGAN.

KRAUT-CUTTER.

No. 12,436. Specification of Reissued Letters Patent. Reissued Jan. 16, 1906.

Original No. 773,769, dated November 1, 1904. Application for reissue filed June 29, 1905. Serial No. 267,669.

*To all whom it may concern:*

Be it known that I, OLIVER E. THOMPSON, a citizen of the United States, residing at Ypsilanti, in the county of Washtenaw, State of Michigan, have invented certain new and useful Improvements in Kraut-Cutters; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a kraut-cutter; and it consists in the construction and arrangement of parts hereinafter fully set forth, and pointed out particularly in the claims.

The object of the invention is to provide simple and efficient means for mounting a gang of knives in the bed of the device and connecting said knives in such manner as to enable them to be adjusted in unison, so that an absolute uniformity of adjustment may be attained and the knives securely locked after adjustment.

I accomplish the above object by the mechanism illustrated in the accompanying drawings, in which—

Figure 1:
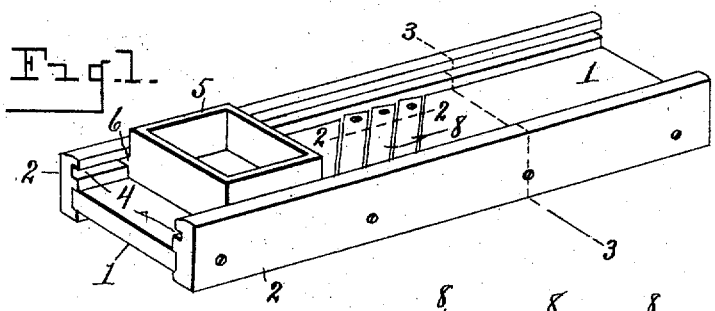
Figure 2:
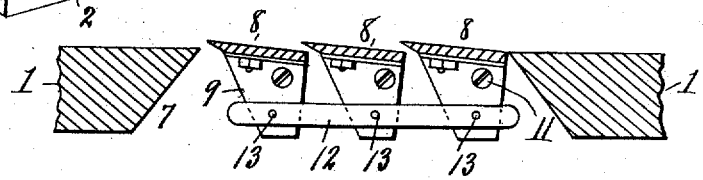
Figure 4:
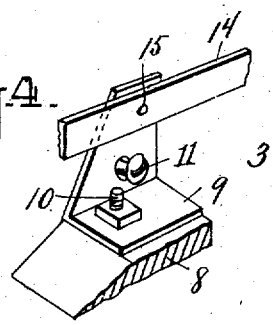
Figure 3:
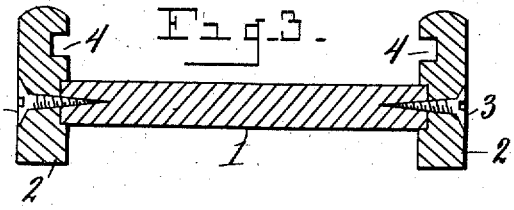
Figure 5:
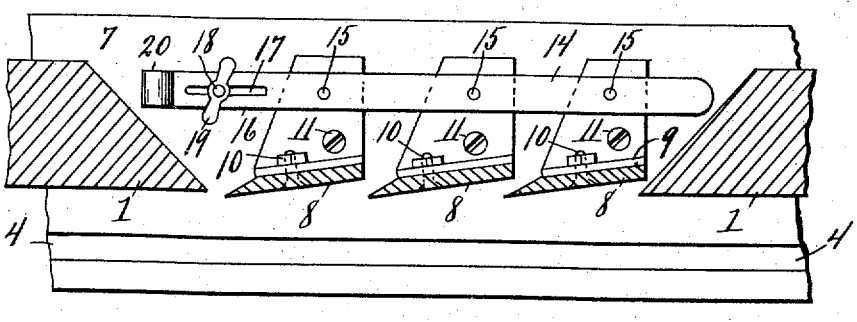
Figure 5:
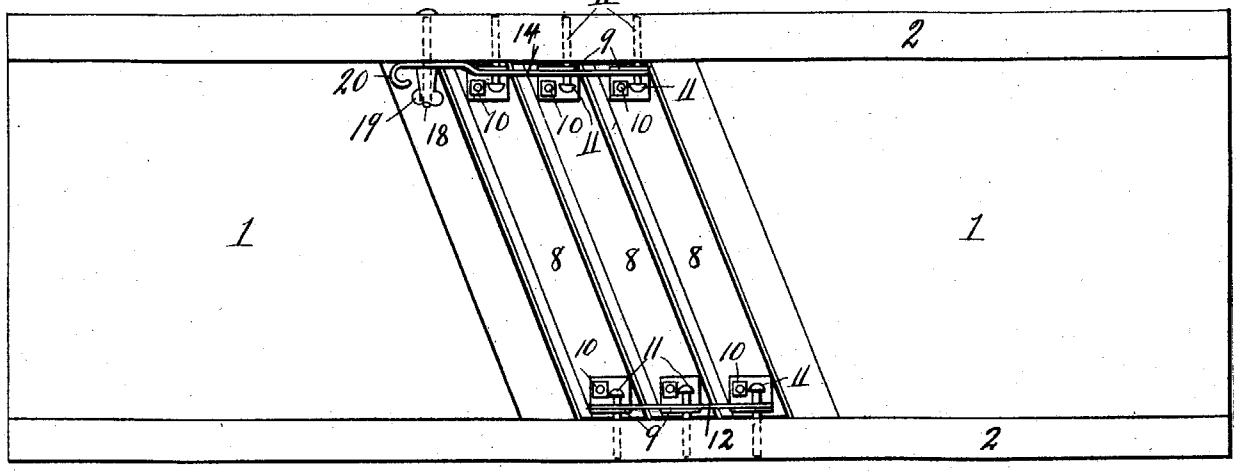

Figure 1 is an isometrical view of my improved kraut-cutter. Fig. 2 is an enlarged sectional view through the bed of the cutter and the knives mounted therein, as on line 2 2 of Fig. 1. Fig. 3 is a transverse section as on line 3 3 of Fig. 1. Fig. 4 is a perspective view of the end of one of the knives, showing the angle-bracket bolted thereto and a portion of the connecting-bar pivoted to said bracket. Fig. 5 is an enlarged sectional view through the bed inverted, showing the knives in transverse section and the adjustable connecting-rod which unites the blades of the knives. Fig. 6 is a bottom plan view of the entire device.

Referring to the characters of reference, 1 designates the bed, which is preferably of wood and which is embraced by the sides 2, being secured in place between the sides by the screws 3. In the inner face of each of the sides is a channel 4, and mounted between the sides is a box 5, in which the heads of the cabbage are confined for passage over the knives, said box having a projecting tongue 6 on its opposite ends which enters the channels 4, whereby it is retained in place and directed in its movement. Formed through the bed is a diagonal opening 7, which crosses from side to side and in which is pivoted a gang of knives 8. Each of said knives is provided at its ends with an angle-bracket 9, which is bolted at 10 to the under face of the knife and is pivoted at 11 to the side 2. Crossing between the brackets 9 at one end of the knives is a connecting-bar 12, which is pivoted at 13 to said brackets. At the opposite ends of the knives the brackets 9 are connected by a cross-bar 14, which is pivoted at 15 thereto and is provided with an extended end 16, having a longitudinal slot 17 therein. Passing through the slot 17 and engaging the frame is a bolt 18, having a thumb-nut 19 thereon. Upon the end of the connecting-bar 14 is a loop or hook 20, affording means for engaging said bar to adjust it longitudinally.

It will be observed that by shifting the bar 14 longitudinally the knives will be rocked upon their pivotal centers 11, so as to cause their cutting edges to stand above the plane of the bed 1, as shown in Fig. 2. By this means the knives may be adjusted so as to cut any thickness of slices, and by reason of the fact that the knives are connected in the manner shown their adjustment is made uniform, obviating the necessity of adjusting each knife separately. When the knives have been adjusted as required, they are all securely locked in position by tightening the thumb-nut 19, so as to lock the connecting-bar 14. To change the adjustment of the knives, it is only neccessary to loosen said nut and move the connecting-bar 14, thereby rocking the knives upon their pivots, so as to cause their cutting edges to stand in the desired plane.

The cabbage to be cut or sliced is placed in the box 5, which confines it in place and which being opened at the bottom permits the cabbage to come into contact with the knives as the box is caused to reciprocate between the sides 2.

Because of the fact that the knives are set at an angle it is necessary to allow of a slight longitudinal movement thereof in order to enable them to tilt freely without striking the sides of the opening in which they are pivoted. This longitudinal movement is provided for by means of the pivot-screws 11, which pass freely through the brackets 9 and are of such length as to allow of a longitudinal movement of the knives thereon as said knives are tilted.

The attachment of the knives to the angle-brackets by means of the bolts 10 enables said knives to be readily removed by simply withdrawing said bolts, obviating the necessity of removing anything but the knives themselves when it is desired to sharpen them.

Having thus fully set forth my invention, what I claim as new, and desire to secure by Letters Patent, is—

1. In a kraut-cutting machine, the combination of a bed having a diagonal opening therein, knives set diagonally in said opening, brackets bolted to the face of said knives at their ends, said brackets having extending portions, pivot-pins passing through the extending portions of said brackets, said pivot-pins being of such length as to allow of a longitudinal movement of said knives as they tilt, a connecting-bar to which all of the brackets are independently pivoted, said bar being adjustable longitudinally to tilt the knives in unison and having a slot therein and a locking-bolt passing through said slot and engaging said frame.

2. The combination of a bed having a diagonal opening therein, knives set diagonally in said opening, brackets secured to said knives at their ends, pivot-pins passing through said brackets, said pins being of such length as to allow the knives to tilt and to have a slight longitudinally-reciprocatory movement, a connecting-bar to which all of the knives are independently pivoted, said bar being movable longitudinally to tilt the knives in unison, and means for locking said bar.

In testimony whereof I sign this specification at Ypsilanti, Michigan, this 14th day of June, 1905, in the presence of two witnesses.

OLIVER E. THOMPSON.

In presence of—
L. S. GREER,
JOHN H. THOMPSON.